Figure 1:
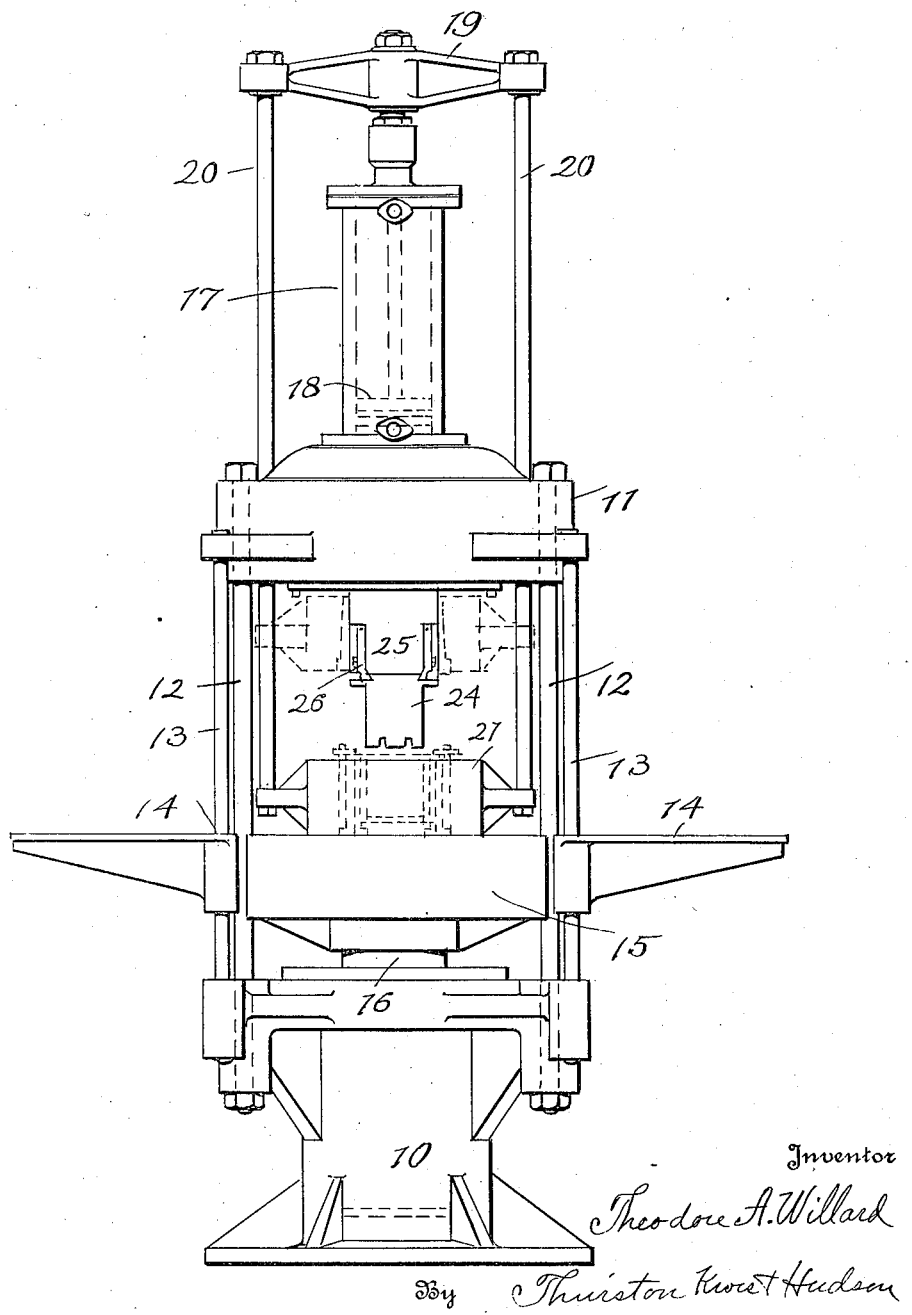

Oct. 25, 1927. 1,646,568
T. A. WILLARD
PRESS
Filed Dec. 17, 1923 3 Sheets-Sheet 1

Inventor
Theodore A. Willard
By Thurston Knoet Hudson
Attorneys

Oct. 25, 1927. 1,646,568
T. A. WILLARD
PRESS
Filed Dec. 17, 1923 3 Sheets-Sheet 2
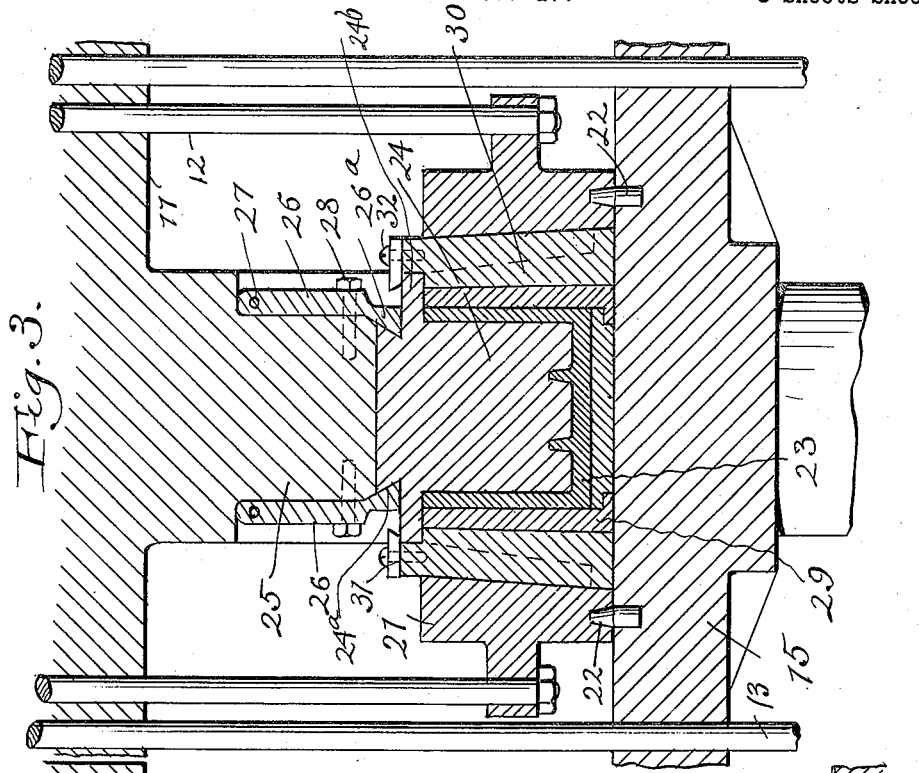
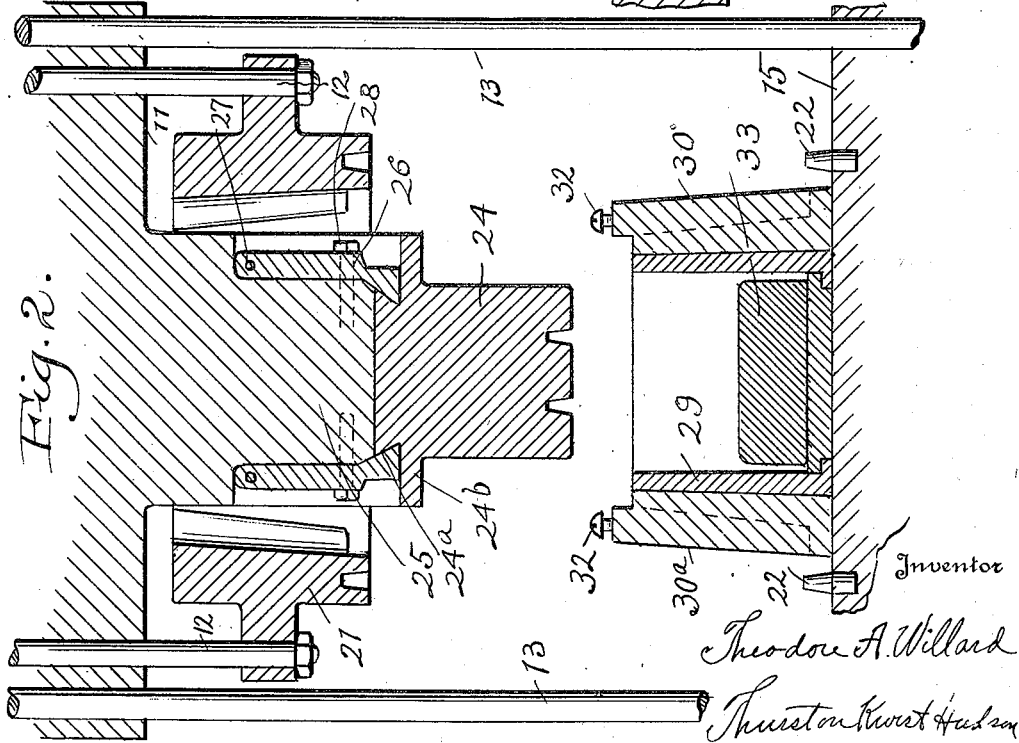
Inventor
Theodore A. Willard
Thurston Kwist Hudson
Attorneys

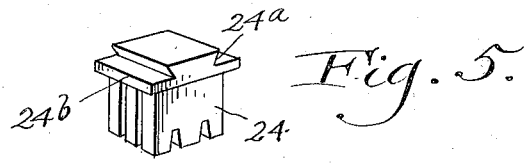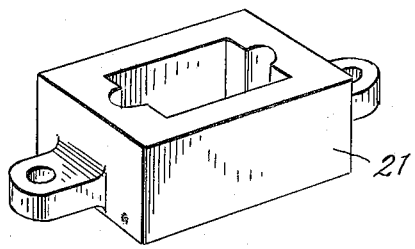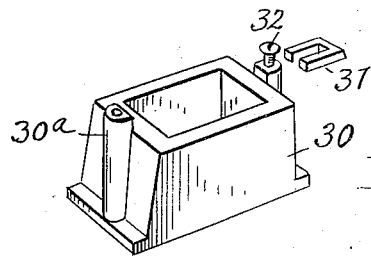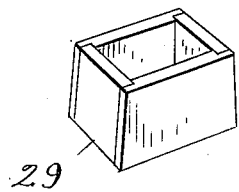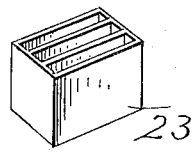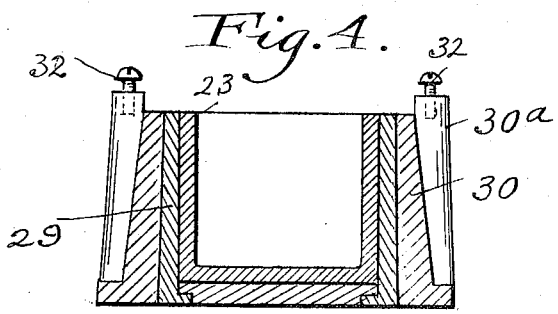

Patented Oct. 25, 1927.

1,646,568

UNITED STATES PATENT OFFICE.

THEODORE A. WILLARD, OF CLEVELAND HEIGHTS, OHIO.

PRESS.

Application filed December 17, 1923. Serial No. 681,109.

This invention relates to a mold press for molding rubber jars and cases or containers of like nature.

As is well known, hard rubber storage battery jars and multi-compartment cases are formed from soft or unvulcanized rubber, and later cured in a vulcanizer. In some instances the containers are formed from sheet rubber with the edge portions of the sheet lapped where necessary and firmly pressed together by a hand manipulated roller, or in a press. In other instances the containers are molded one at a time, from a batch of rubber. In any event, the container is formed on or around a core or mandrel which is left in the container during vulcanization.

In making the larger containers, such as monobloc multi-compartment cases, the core and rubber units are quite heavy, and considerable labor is required to handle and convey them to and from the vulcanizer, and if they are formed in a press or molding machine, a great deal of muscular effort and labor are required in manipulating the parts.

The principal object of the present invention is to provide a press by which these containers can be formed rapidly and effectively with a minimum amount of lifting and other manual work.

The invention resides in a press having certain novel details of construction, and combinations and arrangements of parts which will be described in the specification and set forth in the appended claims.

In the accompanying sheets of drawings, Fig. 1 is a side view of the press; Figs. 2 and 3 are enlarged sectional views showing the principal parts employed in forming the container. Fig. 2 showing the parts before the container is formed, and Fig. 3 after it is formed; Fig. 4 is a view partly in elevation and partly in section, showing the unit which is removed from the press and taken to the vulcanizer to vulcanize the soft rubber container formed in the press, this unit including the core which has been disengaged from the head of the press, the soft rubber surrounding it, a sectional mold box surrounding the rubber, and a frame to hold the mold box; Fig. 5 is a sectional view of a core which during the molding process is attached to the head of the press; Fig. 6 is a perspective view of a heavy steel frame which forms a part of the press and encloses the relatively light frame, in turn enclosing the sectional mold; Fig. 7 is a perspective view of the light frame which encloses the mold; Fig. 8 is a perspective view of the sectional mold composed of bottom, side and end plates; and Fig. 9 is a perspective view of a storage battery case which is adapted to be formed by this machine, this view showing the completed case after vulcanization.

The press constituting the subject matter of the present invention includes a stationary base 10, and a stationary top frame member 11 held in fixed position with respect to the base by suitable columns 12. Also in this instance extending between the base and top frame member 11 are a series of rods 13 carrying swingable tables which may or may not be employed, and are immaterial to the present invention, these being employed, if desired, to support the parts before or after the molding operations, and may be utilized to facilitate the use of the press.

The molding is done on a table 15, which in this instance is vertically movable, being carried at the top of a plunger 16 fitting into a cylinder formed in the base 10, and adapted to receive suitable fluid under pressure to elevate the table and provide sufficient pressure to mold the material being operated on, in this instance unvulcanized rubber, into the desired shape of the container. Hydraulic pressure is preferably provided in this cylinder as well as in another to be referred to presently, as the pressure required for the molding operation is considerable.

At the top of the machine is a second cylinder 17, also preferably a hydraulic cylinder. This cylinder contains a piston, indicated by dotted lines at 18 extending upward through the top of the cylinder and connected to a cross-head or yoke 19, the ends of which are connected to rods 20 which extend through the top frame member 11, and at their lower ends are passed through laterally projecting lugs or ears of a heavy or strong rectangular frame 21, which during the molding operation rests on the bed 15 at a definite position thereon which may be determined by suitable dowel pins 22. This frame preferably consists of a heavy steel casting, as it must resist the severe pressure utilized in the molding operation, and encloses the relatively light parts or the unit which is conveyed from the machine to the vulcanizer. While this frame rests on the bed 15 during the molding operation and is lifted up with the other part supported on the bed, it is movable relative to the bed to the position shown in Fig. 2 for a purpose to be explained presently.

This machine may be utilized for forming single or multi-compartment containers which are commonly employed in storage batteries, the single compartment containers consisting of so-called jars, one of which forms part of each cell of a storage battery, and several being designed to be arranged side by side usually in a wooden box. The multi-compartment containers when employed in storage batteries, do away with the necessity of the separate jars and the wooden box. Such containers may have any number of compartments, the number depending, of course, upon the number of cells that the battery is to have. My invention has particular utility in forming these multi-compartment containers or cases, and the details shown on Fig. 3 of the drawings are adapted for forming a container of that kind. These details are shown, of course, without intending to limit the invention to a machine adapted for this type of container. In Fig. 9 I have shown at 23, a three-compartment container of the type referred to, although, of course, the number of compartments may be greater, or even less than three.

Regardless of the number of compartments of the container which is formed in the machine, the container is formed on, or molded about a core 24, which during the molding operation is secured to a stationary head or boss 25 on the under side of the top frame member 11 of the machine, but the core is detachably secured to the head so that it may be quickly detached after the container is molded. The core may be secured to the head in different ways, or by different instrumentalities, but in this instance it is secured by a pair of clamps 26, pivoted at 27 in slots formed in opposite sides of the head, and provided at their lower ends with V-shaped portions 26ª adapted to engage under undercut portions 24ª of the core 24, as clearly shown in Figs. 2 and 3. The clamps may be secured in place by bolts or screws 28 which are designed to be loosened or backed away a sufficient distance to allow the clamps to swing out so that the dove-tailed or undercut part at the top of the core will clear the ends of the clamps. Any other suitable manner of temporarily securing the core to the head may be utilized. It should be noted in passing that just beneath the undercut portions 24ª of the core, laterally projecting flanges 24ᵇ are provided which constitute that part of the mold for forming the top edge of the container, and are utilized also, as will be subsequently explained, to secure the core to the frame which encloses the sectional mold when the rubber and mold unit is removed from the press to vulcanize the container.

A sectional mold box or mold is utilized, such, for example, as shown at 29 in Fig. 8, this mold being composed of a bottom plate and side end plates which are preferably interfitted, as shown in this figure. This sectional mold or mold box is adapted to be received in a frame 30, such as shown in Fig. 7, the sectional mold 29, the frame 30 and the core 24 being preferably formed of light but strong material such as aluminum, the lightness being desired so as to minimize the labor required in lifting the unit and the parts thereof.

The sectional mold 29 fits tightly in the frame 30, and if desired, the outer walls of the mold and the inner walls of the frame may be on a taper to facilitate the insertion into or removal of the mold from the frame. And the heavy outer frame 21 is designed to fit tightly around the lighter frame 30 during the molding operation, but as already explained, the frame 21 which forms a part of the press is adapted to be elevated or pulled up from the frame 30 after the molding operation, by the plunger in the upper hydraulic cylinder. The outer walls of the frame 30 and the inner walls of the frame 21 are also preferably tapered to enable the outer frame to be stripped off from the inner frame immediately following the upward or molding stroke of the table 15.

It might be stated at this point that immediately following the molding or pressing operation, and while the parts are in the position shown in Fig. 3, the core 24 is secured to the outer frame 30 before the core is disengaged from the head 25 so as to hold the core in place in the mold and prevent the rubber pushing the core outward when the latter has been disengaged from the head. This can be done in different ways, but in this instance by a pair of U-shaped clamps 31, shown in Figs. 2 and 3, and one in Fig. 7, which clamps are adapted to be slipped under the heads of screws 32 arranged at the upper ends of bosses 30ª at the ends of the frame 30, and over the laterally projecting flanges 24ᵇ at the upper part of the core 24, the screws 32 being preferably tightened after the clamps are slipped into place.

In operation the mold box 29, containing a batch of soft or unvulcanized rubber, shown at 33 in Fig. 2, with the mold box enclosed in a frame 30, are placed on the table 15 when the latter is in lowered position shown in Fig. 2, and after being so placed, the upper frame 21 is lowered onto the table 15 so as to fit tightly around the frame 30, the same being centralized by the dowel pins as already stated. The stationary head 25 is then provided with a core 24 which is attached and held to the core in the manner illustrated in Fig. 2. Then pressure is supplied to the lower cylinder and the table 15 is elevated so that the core 24 during this stroke will enter the mold and force the batch of rubber 33 to assume the shape of the container to be formed, very severe pressure being required to cause the rubber to flow and to fill all the interstices of the core and the spaces between the core and mold with the rubber sufficiently compressed to avoid the liability of so-called leakers.

As soon as the stroke of the press is completed, the clamps 31 are slipped into place as shown in Fig. 3 so as to lock the core to the frame 30, and as soon as this is done, the screws 28 are backed away so as to release the clamps 26 which were utilized to hold the core to the head. Then with the table still in elevated position, hydraulic pressure is applied to the upper cylinder, and the outer frame 21 is stripped from the inner frame 30 and moved to its uppermost position, shown in Fig. 2.

Then the table 15 is lowered, carrying with it the frame 30, the mold box, the mold container and the core 24, this now being a unit, which is free on the table and can be removed from the table preparatory to being placed in the vulcanizer.

As soon as this unit, the metal parts of which are formed of light material as already explained, is removed from the table, another mold encased in a frame 30 is placed on the table, another core is secured to the head 25, the outer frame 21 is lowered as before, and another molding stroke is given to the table of the press, this being followed by the clamping of the core to the inner frame surrounding the sectional mold, the release of the core from the head, the stripping of the outer frame from the inner frame, and the lowering of the table.

In this manner containers can be molded with rapidity, but at the same time very good containers are formed, and the labor in handling the parts is minimized for the reason that the heavy part necessary to resist the strain in molding is separable from the relatively light parts which immediately enclose the rubber, and which together with the rubber and light core constitute the unit which is to be removed for vulcanization.

I do not desire to be confined to the precise details shown, but aim in my claims to cover all modifications which do not involve a departure from the spirit and scope of the invention as defined in the appended claims.

Having described my invention, I claim:

1. In a press of the character described, a table and a head relatively movable, power means for moving one of said parts relative to the other for the molding operation, a mold box adapted to be placed on the table to receive the core during the compressing stroke, a frame constituting a part of the press for resisting the lateral strains incident to the molding operation, and separate means for moving said frame.

2. In a press, a vertically movable table, power means for moving it, a stationary head, a mold adapted to be supported on the table, a core adapted to enter the mold on the movement of the table toward the head, a frame for resisting the lateral pressure during the molding operation, and means for moving the frame independently of the table.

3. In a press, a table and a head spaced one above the other, power means for moving one of said parts relative to the other, a core adapted to be removably attached to the head, a mold adapted to receive the core during the molding operation and comprising a frame, means for disconnecting the core from the head, means for fastening the core to said frame, a rigid frame forming a part of the press and adapted to enclose the first-named frame during the molding operation, and means for moving said second frame.

4. In a press, a vertically movable table, power means for operating it, a stationary upper frame member, a core adapted to be detachably secured thereto, a mold adapted to be placed on the table and to receive the core during the molding operation and including a frame to which the core is adapted to be secured after the molding operation, whereby it may be removed with the mold and molded container after being detached from the head, and a rigid strain resisting frame forming a part of the press, and power means for stripping it from the first-named frame.

5. In a press for molding articles from plastic composition, a head, a bed, power means for moving one relative to the other, a substantially rectangular mold unit, a core, means for detachably securing the core to the head, means for securing the core to the mold unit after the molding operation, and a member movable relative to the mold unit adapted to receive the latter and serving to resist lateral stresses during the molding operation, said mold unit with the molded container and core being removable from the press whereby the container may be cured outside of the press.

In testimony whereof, I hereunto affix my signature.

THEODORE A. WILLARD.